Patented Oct. 6, 1925.

1,556,415

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

PROCESS FOR RETARDING THE DETERIORATION OF RUBBER AND SIMILAR MATERIALS AND PRODUCTS OBTAINED THEREBY.

No Drawing.     Application filed August 8, 1923. Serial No. 656,454.

*To all whom it may concern:*

Be it known that I, SIDNEY M. CADWELL, a citizen of the United States, residing at Leonia, county of Bergen, State of New Jersey, have invented certain new and useful Improvements in Processes for Retarding the Deterioration of Rubber and Similar Materials and Products Obtained Thereby, of which the following is a full, clear, and exact description.

This invention relates to processes for retarding the deterioration of rubber and similar materials such as balata and to the products obtained thereby.

The principal object of the invention is to provide a simple, efficient process for retarding deterioration of rubber, while the rubber is being handled, in storage and elsewhere, and to provide a series of products as a result having great resistance to deterioration.

The invention accordingly comprises a process for retarding the deterioration due to oxidation of rubber and similar materials which comprises treating vulcanized rubber with an agent substantially unable to activate oxygen but adapted to absorb appreciable amounts of activated oxygen; and products obtained from such process. The term "agent" is intended to include the employment of one or more substances which may be complementary substances having the characteristics mentioned.

*Example 1.*

In carrying out the invention in its preferred form a vulcanized rubber sheet, say .010 of an inch thick, obtained for example, by combining 100 parts of rubber, 2 parts of zinc oxide, 2 parts of oxy normal butyl thiocarbonic acid disulphide, 2 parts of sulphur, and vulcanized over night at 140° F. in aniline vapor may be employed. A piece of this vulcanized rubber is suspended in the vapor of aniline at 140° F. for 10 minutes. Thereafter the rubber is suspended in the vapor of acetaldehyde at ordinary temperature, 70° F., for 10 minutes. It will be understood that if the compound contains sufficient aniline after vulcanization, as just given, or from any other vulcanization employing aniline it may not be necessary to suspend the rubber in the vapor of aniline for 10 minutes as just noted, but instead this step may be omitted and the remainder of the process may be then carried out as below. The aniline and acetaldehyde are absorbed by the vulcanized rubber and being one type of complementary substances react to form a condensation product. The treated vulcanized rubber is allowed to stand at ordinary temperatures for 2 hrs. in order to allow complete permeation of all the chemicals. Instead of natural aging which would require the carrying out of comparative tests for a longer period, perhaps extending over several years, accelerated aging has been carried out upon the compounds so treated. A piece is placed in a chamber maintained at 212° F. in open air along with another piece identical therewith except for the treatment, above mentioned, with acetaldehyde and aniline vapor. At this temperature the untreated sample deteriorated more in tensile strength at the end of 16 hrs. than the sample, treated as above, deteriorated at the end of 48 hrs. Similar comparative results were also obtained by carrying out the accelerated aging at 150° F. instead of 212° F.

It is believed that the acceleration of deterioration as promoted by the temperatures employed in the examples whereby deterioration occurs in rubber at a short period is comparable with ordinary shelf aging or aging in storage.

*Example 2.*

Instead of treating the vulcanized rubber in the first example with the vapor of aniline and acetaldehyde, a 5% benzol solution of an accelerating condensation product of acetaldehyde and aniline whose preparation is described in my co-pending application, Serial No. 641,764, filed May 26, 1923, is prepared and the vulcanized compound having a thickness of approximately 0.01 inch, for example, is dipped therein for 1 min. at 70° F. The rubber is removed, the benzol allowed to evaporate and the condensation product remains in the rubber to retard its deterioration. Accelerated aging tests as carried on in Example 1 produce a similar result to that there indicated.

Example 3.

Instead of employing a benzol solution of the accelerating condensation product of acetaldehyde and aniline, the acetaldehyde-aniline acid condensate which does not accelerate vulcanization may be employed. The preparation and a use of this material is described in my co-pending application, Serial No. 656,453, filed August 8, 1923. The use of this condensate which does not accelerate vulcanization is particularly valuable in treating compounds containing a large amount of uncombined sulphur because the addition of an accelerating material tends to combine sulphur with rubber causing deterioration due to over-vulcanization.

A compound .030 of an inch thick, made up of 100 parts of rubber, 8 parts of sulphur, 3 parts of aniline and vulcanized for 90 minutes under 40 pounds steam pressure is painted with a 10% benzol-alcohol solution of the acetaldehyde-aniline acid condensate. The benzol-alcohol mixture contains 4 parts of benzol and 1 part of alcohol. Treatment of the vulcanized compound in this way greatly improves its resistance to ordinary shelf aging.

Example 4.

Instead of applying a material as in the above examples directly to vulcanized rubber to retard deterioration, an amount of solid paranitrosodimethylaniline equivalent to 2% of the weight of a vulcanized rubber article may be placed in the container of the vulcanized article before placing it on the shelf of a shop or otherwise storing it. The paranitrosodimethylaniline volatilizes at ordinary temperatures, is absorbed by the rubber and retards its deterioration. A piece of rubber treated by exposure for 50 hrs. to paranitrosodimethylaniline when exposed to the accelerated aging tests given in Example 1 showed a similar result to that there given.

Aging of compounds treated to retard deterioration as above has been carried out by suspension of these compounds in sunlight along with pieces of rubber untreated by a retarder of deterioration. The treatment of the material with the above retarders of deterioration improves by about 100% resistance to aging by sunlight. The retarder may be introduced as a solid, liquid, gas or in solution. Instead of introducing aniline and acetaldehyde as in the preferred example into the rubber as vapors, the rubber may be dipped separately into acetaldehyde and into aniline or into their solutions and allowed to remain until a sufficient quantity of the condensation product has been formed and absorbed by the rubber.

In carrying out the process as given in the second example other solvents than benzol may be employed such as solvent naphtha, gasoline, carbon tetrachloride, etc. Instead of dipping the rubber in a solution of the condensation product of acetaldehyde and aniline as given in the above examples the solution may be painted or sprayed or otherwise brought into contact with the rubber so that the condensation product may be absorbed thereby. In connection with the fourth example employing paranitrosodimethylaniline other methods may be employed for bringing this volatile substance into contact than by placing it in the container for the article. For example the rubber may be placed in a room or other chamber containing such volatilized substance.

Two causes of deterioration of rubber may be described as oxidation and over-vulcanization. The present invention is directed particularly to retarding deterioration by oxidation. It appears that oxidation causes a considerable portion of the deterioration of rubber particularly in compounds which do not contain an excess of sulphur and that oxidation is accelerated by various substances which occur in the rubber particularly after vulcanization. It has been demonstrated that many substances such as linseed oil and manganese salts which are known to activate oxygen actually accelerate the deterioration of raw and vulcanized rubber and similar materials, by reaction therewith of activated oxygen. It appears that substances which retard deterioration probably combine with activated oxygen which is given up by the accelerating material. In other words a retarder of deterioration is a substance which is capable of absorbing the activated oxygen and thus preventing it from reacting upon rubber to cause deterioration. It is obvious that a substance which is capable of absorbing and activating oxygen from the air or from some other substance would act as an accelerator and not as a retarder of deterioration. Therefore a retarder of deterioration is defined as a substance or mixture of substances which in rubber will absorb oxygen particularly in the form of activated oxygen, but which will not substantially activate oxygen.

It has been found that substances which retard deterioration are substantially unable to activate oxygen but are adapted to absorb activated oxygen. A convenient means for determining whether a substance absorbs activated oxygen or not is as follows: Activated oxygen is prepared by running air through turpentine from one to three hours, and to 1 cc. of this turpentine containing activated oxygen, I add an excess, about 1 cc. of a ⅓ to ½ molar, benzol solution of the substance to be tested;—for instance, the accelerating condensation product of acetaldehyde and aniline. After standing from fifteen to thirty minutes there is added ½ cc. of $\frac{N}{500}$ aqueous solution of indigo carmine. The indigo carmine solution is not decolorized.

The activated oxygen in the turpentine acts to decolorize the indigo carmine. If the substance being tested is capable of absorbing the activated oxygen it will do so and the indigo carmine under such circumstances will not be decolorized, in other words, if the indigo carmine loses its color the substance being tested does not absorb activated oxygen. If the indigo carmine does not lose its color the substance being tested does absorb activated oxygen.

It is somewhat inconvenient to employ turpentine containing activated oxygen, therefore as indicated in the ensuing table, I have tested the absorptive character of many of the substances by another means which gives approximately the same results as the test with activated oxygen and therefore may be regarded as comparable. For this test, a benzol solution containing 1 gram of the substance is prepared and to this solution is added an $\frac{N}{10}$ solution of iodine in benzol, either alone or in the presence of a catalyst such as mercuric chloride. Absorption of iodine is indicated by the change in the color of the resulting solution or by treating a drop of aqueous starch paste with a drop of the solution. Where iodine and mercuric chloride are employed together it has been found that 1 gram of a retarder of deterioration absorbs more than 5 cc. of an $\frac{N}{10}$ solution of iodine in benzol.

In order to determine whether substances activate oxygen, air is bubbled through 1 cc. of benzol or other solution of the substance to be tested for from 1 to 3 hrs., two drops of an $\frac{N}{500}$ aqueous solution of indigo carmine acidified with acetic acid and sulphuric acid, being present. The addition of the indigo carmine solution may be made after air has been bubbled through the solution if desired. If the substance being tested is adapted to activate oxygen the indigo carmine is decolorized. If the indigo carmine is not decolorized the substance does not activate oxygen. Instead of indigo carmine an aqueous solution of potassium iodide containing some starch solution may be used. Where the test is carried out with potassium iodide if activated oxygen is present the solution assumes a blue color.

The following substances have been determined, by the tests above indicated, to be retarders of deterioration. They do not activate oxygen and do absorb activated oxygen or iodine. They possess the properties indicated opposite them as determined by the tests herein outlined:—

*Retarders of deterioration.*

| Substance | Per cent concentration in benzol except where indicated | Amt. iodine absorbed | Additional amount iodine absorbed with catalyst | Activate oxygen (iodine liberated) | Activate oxygen (decolorized indigo) | Absorb activated oxygen |
|---|---|---|---|---|---|---|
| Acetaldehyde orthotoluidine. | 5-10 | 30 | 10 | No. | No. | Yes. |
| Butyraldehyde aniline. | 10 | More than 5. | | | | |
| Heptaldehyde ethylamine. | 10 | 20 | | | | |
| Hexamethylenetetramine. | Water sat. sol. | Less than 1. | 0 | No. | No. | Yes. |
| Heptaldehyde aniline. | ¼-10 | More than 5. | | | | Yes. |
| Formaldehyde aniline. | 15 | More than 5. | | | | |
| Valeraldehyde aniline. | 5-10 | More than 6. | | | | |
| Heptaldehyde ammonia. | ¼-½ | More than 5. | | | | |
| Triethyltrimethylene triamine. | 10 water. | More than 10. | | | | |
| Phenylhydrazine. | 10 | More than 10+. | 0 | No. | No. | Yes. |
| Propion aldehyde ammonia. | 5 | 40 | | | | |
| Monomethyl aniline acetaldehyde. | 5 | 4 | 12 | | | |
| Paraphenylaminediamine acetaldehyde. | 4 | 30 | | | | |
| Cinnamaldehyde ethyl amine. | 5 | 38 | 1 | | | |
| Propionaldehyde aniline. | 5 | 4 | 10 | | | |
| Methylamine acetaldehyde. | 2-5 | 40 | 0 | | | |
| Naphthylamine heptaldehyde. | 5 | 1 | 18 | | | |
| Acetaldehyde paratoluidine. | 4 | 5 | 7 | | | |
| Paranitrosodiphenyl amine. | 1 | 0 | 10 | No. | No. | Yes. |
| Paranitrosodimethyl aniline. | 2 | 5+ | | Yes; slowly | No. | Yes. |
| Nitroso B naphthol. | 4 | 0 | 6 | No. | No. | Yes. |
| Paranitrosodiethyl aniline. | 5 | 20 | | No. | No. | Yes. |
| Diphenylnitrosoamine. | 5 | 0 | 1 | No. | No. | Yes. |
| Paraiodoaniline. | 5 | 0 | 0 | No. | No. | Yes. |
| Para aminophenol hydrochloride. | Alcohol and C₆H₆ | 0 | 3 | No. | No. | Yes. |
| Para benzyl amino phenol hydrochloride. | do. | 0 | 0 | | No. | Yes. |
| Normal butyl nitrile. | | 0 | 0 | | | |
| O-chloro aniline. | 5 | 0 | 0 | No. | No. | Yes. |
| Iodo benzene (freshly prepared). | 5 | 0 | 0 | No. | No. | Yes. |
| Dichlorohydroquinone. | 5 alcohol and benzol. | 0 | 0 | | | Yes. |
| Acetaldehyde ethylenediamine. | 5 | | | | | Yes. |
| Acetaldehyde aniline acid condensate. | 5 | 4 | 4 | No. | No. | Yes. |
| Condensate melting at 126° C. | 5 | None. | 3 | | No. | |

It is pointed out in connection with the above table that all of the substances there listed do retard deterioration; all do not possess the same effectiveness in retarding deterioration, some of them are equal in effectiveness to the specific examples given, others are somewhat less effective. A dash in the above table indicates that no test was made.

The list of substances is followed by a column headed "concentration in benzol except where indicated." The figures in this column give the concentration of the benzol solution of the substance into which the rubber was dipped for one minute prior to its being maintained at 212° F. for aging. In the case of hexamethylenetetramine a saturated aqueous solution was employed. In the case of triethyltrimethylenetriamine a 10% solution was used. Para amidophenol-hyrochloride and dichlorhydroquinone and parabenzylaminophenolhydrochloride were dissolved in a mixture of alcohol and benzol. The acetaldehyde ethylenediamine was prepared in the rubber by treating it with the vapor of the two components, acetaldehyde and ethylenediamine.

The next column is headed "amount of iodine absorbed". The figures in this column indicate the number of cc. of $\frac{N}{10}$ iodine in benzol absorbed by benzol solution of 1 gram of the substance. In obtaining these figures it was desired to determine whether the substance would absorb iodine but not necessarily to determine how much iodine the substance would absorb, therefore, in some cases more iodine would have been absorbed if it had been added.

The next column is headed "additional amount of iodine absorbed with catalyst". Figures in this column indicate the additional number of cc. $\frac{N}{10}$ iodine in benzol absorbed by a benzol solution of 1 gram of substance in the presence of a few drops of alcoholic solution of mercuric chloride.

The next column is headed "activate oxygen (idoine liberated)". "Yes" in this column indicates that the substance liberates iodine from aqueous solution of potassium iodide with which it is treated after it has been agitated with air. "No" indicates that no iodine is liberated in this test.

The word "Yes" in the column headed "activate oxygen (decolorized indigo)" indicates that after agitation with air the substance is capable of decolorizing an aqueous indigo carmine solution which has been acidified with acetic and sulphuric acid.

The next column is headed "absorbs activated oxygen". "Yes" in this column indicates that the substance absorbs activated oxygen in turpentine according to the test described above.

It has also been observed that a benzol solution of the condensation product of acetaldehyde and aniline listed among the retarders of deterioration above absorbs iodine forming a substance which is substantially insoluble in benzol. After a 5% solution of the condensation product has been treated with an excess of iodine the precipitate is separated and the excess iodine removed. Vulcanized rubber was treated with the remaining very dilute benzol solution. The rubber so treated was maintained at 212° F. for 64 hrs. at the end of which time it had deteriorated less than an untreated sample which was maintained at 212° F. for 16 hrs.

In accordance with the tests given above it has also been found that the following substances activate oxygen or contain activated oxygen and hence may be regarded as accelerators of the deterioration of rubber: rape seed oil, raw linseed oil, lead resinate, manganese resinate, rosin, copper oleate, cotton seed oil, China-wood oil, terpineol.

The following substances substantially do not activate oxygen and they do not absorb more than 1 cc. of $\frac{N}{10}$ iodine solution in benzol per gram of substance tested, or more than 5 cc. of $\frac{N}{10}$ iodine solution in benzol in the presence of mercuric chloride; and their action toward deterioration is substantially neutral:—quinoline; aniline, pure; pyridine, dimethylaniline, pure.

Tannic acid is also substantially neutral toward deterioration according to the tests above indicated. It absorbs less than 1 cc. of $\frac{N}{10}$ iodine solution and activates oxygen particularly an alkaline solution.

Tests on all the substances mentioned as retarders of deterioration, as accelerators of deterioration, and as substantially neutral substances have been carried out in accordance with one or more of the examples given and the results so obtained have demonstrated that the classification of the materials is correct.

Various other rubber compounds than given in the examples above have been treated in accordance with the invention by agents for retarding deterioration such as the condensate of acetaldehyde and aniline, paranitrosodimethylaniline, etc. These compounds have included the following: rubber 100 parts, zinc oxide 100 parts, sulphur 7.1 parts, triethyltrimethylenetriamine mixed with an equal weight of stearic acid 2 parts, vulcanized at 275° F. in open air for 2½ hrs.; 100 parts of rubber, 8 parts of sulphur, 2 parts of zinc oxide, 0.3 part of the condensation product of heptaldehyde and aniline vulcanized for 60 minutes under 40 lbs. steam pressure in a mold; rubber 100 parts, sulphur 6 parts, vulcanized under water for 180 minutes at 286° F. These compounds have been employed in varying thicknesses from .010 to ⅜". In the case of thicker compounds it is desirable to subject the material to the retarder of deterioration for relatively longer periods than 1 minute to allow proper penetration of the material. In addition to the above compounds the compounds employed for the production of black shoe uppers containing litharge in the usual amounts, dental dams vulcanized by sulphur monochloride, tire treads containing carbon black and other usual fillers, basket-ball shoe soles containing dibenzylamine, zinc oxide and sulphur vulcanized by treatment with carbon disulphide, and inner tubes have also been treated according to the procedure given above in the examples.

These various compounds have exhibited substantially the same amount of resistance to deterioration by oxidation as given in the examples above.

It will thus be seen that among others the objects of the invention above given are achieved.

As many apparently widely different embodiments of this invention may be made without departing from the spirit thereof, it will be understood that it is not intended to limit the invention to the specific embodiment herein set forth except as indicated in the appended claims.

Having thus described my invention, what I claim and desire to protect by Letters Patent is:

1. A process for retarding the deterioration of rubber due to oxidation which comprises treating vulcanized rubber with an agent substantially unable to activate oxygen but adapted to absorb appreciable amounts of activated oxygen.

2. A process for retarding the deterioration of rubber due to oxidation which comprises causing vulcanized rubber to absorb a substance substantially unable to activate oxygen but adapted to absorb activated oxygen.

3. A process for retarding the deterioration of rubber due to oxidation which comprises subjecting vulcanized rubber to a substance in fluid form substantially unable to activate oxygen but adapted to absorb appreciable amounts of activated oxygen.

4. A process for retarding the deterioration of rubber due to oxidation which comprises treating vulcanized rubber with alternate fluids to form a substance substantially unable to activate oxygen but adapted to absorb appreciable amounts of activated oxygen.

5. A process for retarding the deterioration of rubber due to oxidation which comprises treating vulcanized rubber with an aldehyde amine condensation product.

6. A process for retarding the deterioration of rubber due to oxidation which comprises treating vulcanized rubber alternately with an aldehyde and an amine.

7. A process for retarding the deterioration of rubber due to oxidation which comprises treating vulcanized rubber with an aliphatic aldehyde-aromatic amine condensation product.

8. A process for retarding the deterioration of rubber due to oxidation which comprises treating vulcanized rubber with a reaction product of acetaldehyde and aniline.

9. A process for retarding the deterioration of rubber due to oxidation which comprises treating vulcanized rubber with an acetaldehyde-aniline acid condensate.

10. Vulcanized rubber treated after vulcanization with an agent substantially unable to activate oxygen but adapted to absorb appreciable amounts of activated oxygen.

11. Vulcanized rubber containing an absorbed substance introduced after vulcanization substantially unable to activate oxygen but adapted to absorb appreciable amounts of activated oxygen.

12. Vulcanized rubber treated after vulcanization with a fluid substance substantially unable to activate oxygen but adapted to absorb appreciable amounts of activated oxygen.

13. A vulcanized rubber combined after vulcanization with an aldehyde amine condensation product.

14. A vulcanized rubber combined after vulcanization with an aliphatic aldehyde aromatic amine condensation product.

15. Vulcanized rubber combined after vulcanization with a reaction product of acetaldehyde and aniline.

16. Vulcanized rubber treated after vulcanization with an acetaldehyde aniline acid condensate.

Signed at New York, county and State of New York, this 3 day of August, 1923.

SIDNEY M. CADWELL.